(12) United States Patent
Kazumi (10) Patent No.: US 11,842,094 B2
(45) Date of Patent: Dec. 12, 2023

(54) INSPECTION APPARATUS AND METHOD FOR INSPECTING A PRINTED MATERIAL

(71) Applicant: CANON KABUSHIKI KAISHA, Tokyo (JP)

(72) Inventor: Ryo Kazumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/821,634

(22) Filed: Aug. 23, 2022

(65) Prior Publication Data
US 2023/0062675 A1    Mar. 2, 2023

(30) Foreign Application Priority Data

Aug. 31, 2021    (JP) ................................ 2021-140733

(51) Int. Cl.
G06F 3/12    (2006.01)
G06T 7/00    (2017.01)
B41J 29/393  (2006.01)

(52) U.S. Cl.
CPC ............ G06F 3/121 (2013.01); B41J 29/393 (2013.01); G06T 7/001 (2013.01)

(58) Field of Classification Search
None
See application file for complete search history.

(56) References Cited

U.S. PATENT DOCUMENTS

| 2013/0136315 A1* | 5/2013 | Kawamoto | G06V 30/418 |
| | | | 382/112 |
| 2018/0089818 A1* | 3/2018 | Kobayashi | G06T 7/001 |
| 2022/0092371 A1* | 3/2022 | Tashiro | G03G 15/5041 |

FOREIGN PATENT DOCUMENTS

| JP | 2021053819 A | * | 4/2021 |
| JP | 2021053819 A |   | 4/2021 |

\* cited by examiner

*Primary Examiner* — Miya J Cato
*Assistant Examiner* — Pawan Dhingra
(74) *Attorney, Agent, or Firm* — Canon U.S.A., Inc. IP Division

(57) ABSTRACT

An inspection apparatus includes at least one memory that stores instructions, and at least one processor that executes the instructions to perform determining, in a case where an image of an inspection area is a blank and collation inspection is to be performed on the image of the inspection, whether correct data in the collation inspection is a blank, outputting an inspection result for the inspection area as a success, in a case where it is determined that the correct data is a blank, and outputting an inspection result for the inspection area as a failure, in a case where it is determined that the correct data is not a blank.

12 Claims, 9 Drawing Sheets

NUMBER OF SHEETS FOR INSPECTION: 20/100

| ICHIRO | JIRO |
|---|---|
| SABURO | HANAKO |

INSPECTING

| INSPECTION No. | PAGE No. | COPY No. | SIDE No. | DECODING RESULT | COLLATION RESULT |
|---|---|---|---|---|---|
| 1 | 2 | 3 | 2 | 0000 | NG |
| 2 | 3 | 4 | 1 | BLANK | NG |
| 3 | 4 | 5 | 2 | NG | NG |
| | | | | | |
| | | | | | |
| | | | | | |
| | | | | | |
| | | | | | |

STOP INSPECTION

INSPECTION APPARATUS AND METHOD FOR INSPECTING A PRINTED MATERIAL

BACKGROUND

Field of the Disclosure

The present disclosure relates to an inspection apparatus configured to inspect print quality of a printed material.

Description of the Related Art

In recent years, a print system in which a sheet printed by a print apparatus can be inspected by an inspection apparatus while the sheet is conveyed has been known. In the inspection of the printed sheet, the inspection apparatus reads an image of the conveyed printed sheet, and determines whether the printed sheet is correct by analyzing the read image. The inspection apparatus can detect, for example, a lack of a barcode or ruled line, an image omission, a printing failure, a page omission, and a color shift.

There are two types of inspection for print data in such a print system, as follows:

(1) The first type is an inspection (hereinafter referred to as "reading inspection") in which, in a case where a code image (a barcode or two-dimensional code) cannot be read (cannot be decoded), an inspection result report is output as an inspection failure. The first type is used in a case where it is desired to use only a report for a subsequent apparatus, or correct data is not available.

(2) The second type is an inspection (hereinafter referred to as "collation inspection") in which correct data is prepared beforehand, a result of reading a code image (a barcode or two-dimensional code) is collated with the correct data, and an inspection failure is determined if there is a difference therebetween as a result of the collation. In the collation inspection, a failure is issued in a case where, for example, the code image indicates a different code, and thus a printed material below a certain level can be handled as a failure.

In some printed documents of variable printing, it is correct that nothing (hereinafter referred to as "blank") is placed in a barcode area. When there is a blank at the time of reading the barcode area, it is conceivable that the cause thereof is a data omission or a correct answer being a blank. For a printed material having a blank, it is desirable to distinguish between a case where the correct answer is a blank and a case where a blank is caused by a data omission. Japanese Patent Application Laid-Open No. 2021-53819 discusses a technique in which, in a case where an inspection area is a blank, an inspection is always determined to be a failure, and subsequent printing is stopped, and further, a user is prompted to confirm print data. In other words, in Japanese Patent Application Laid-Open No. 2021-53819, an inspection is determined to be a failure, even in a case where a document including a part intentionally made to be a blank by a user is printed.

SUMMARY

According to embodiments of the present disclosure, an inspection apparatus includes at least one memory that stores instructions, and at least one processor that executes the instructions to perform determining, in a case where an image of an inspection area is a blank and collation inspection is to be performed on the image of the inspection, whether correct data in the collation inspection is a blank, outputting an inspection result for the inspection area as a success, in a case where it is determined that the correct data is a blank, and outputting an inspection result for the inspection area as a failure, in a case where it is determined that the correct data is not a blank.

Further features of the present disclosure will become apparent from the following description of exemplary embodiments with reference to the attached drawings.

DESCRIPTION OF THE EMBODIMENTS

Figure 1:
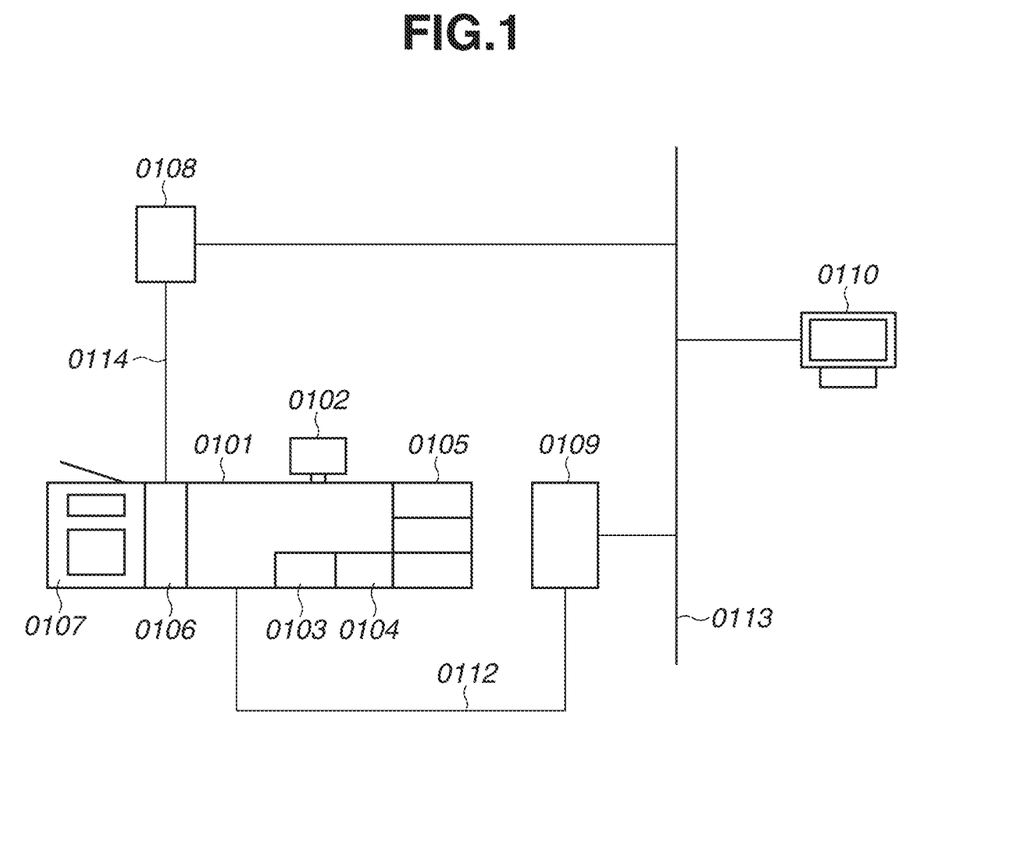
FIG. 1 is a schematic diagram illustrating a configuration of an information processing apparatus, an inspection apparatus, and an image forming apparatus according to a first exemplary embodiment.

FIG. 1 is a schematic diagram illustrating a configuration of an information processing apparatus, an inspection apparatus, and an image forming apparatus, according to a first exemplary embodiment. The image forming apparatus of the present exemplary embodiment will be described using an electrophotographic image forming apparatus as an example, but the image forming apparatus in the present exemplary embodiment may be an image forming apparatus of other type such as an inkjet type or an offset type.

An image forming apparatus 0101 is connected to an information processing apparatus 0109 via a communication cable 0112. The information processing apparatus 0109 is connected to a client computer 0110 and an inspection apparatus 0108 via a network 0113. The image forming apparatus 0101 includes a user interface (UI) panel 0102, a paper feed deck 0103, and a paper feed deck 0104. An optional deck 0105 including three paper feed decks is connected. The image forming apparatus 0101 is, for example, an electrophotographic image forming apparatus. The UI panel 0102 is, for example, a user interface including a capacitance-type touch panel.

The image forming apparatus 0101 includes an inspection unit 0106 and a large capacity stacker 0107. The inspection unit 0106 is connected to the inspection apparatus 0108 via a communication cable 0114. The large capacity stacker 0107 includes a main tray and a top tray, and several thousands of sheets can be stacked on the main tray at a time.

A print job is generated in the client computer 0110, and the generated print job is transmitted to the information processing apparatus 0109 via the network 0113 and managed in the information processing apparatus 0109. This print job is transmitted from the information processing apparatus 0109 to the image forming apparatus 0101 via the communication cable 0112, and the image forming apparatus 0101 performs printing processing on a sheet based on the received print job. A print job may be generated and managed in the information processing apparatus 0109, and the print job may be transmitted to the image forming apparatus 0101 via the communication cable 0112 and managed in the image forming apparatus 0101.

All of the client computer 0110, the information processing apparatus 0109, and the inspection apparatus 0108 may communicate with the image forming apparatus 0101 via a communication cable. In other words, the configuration for connecting the image forming apparatus 0101, the information processing apparatus 0109, and the client computer 0110 in the present exemplary embodiment is an example, and it is needless to say that there are various connection configurations other than the example described in the present exemplary embodiment.

Figure 2:
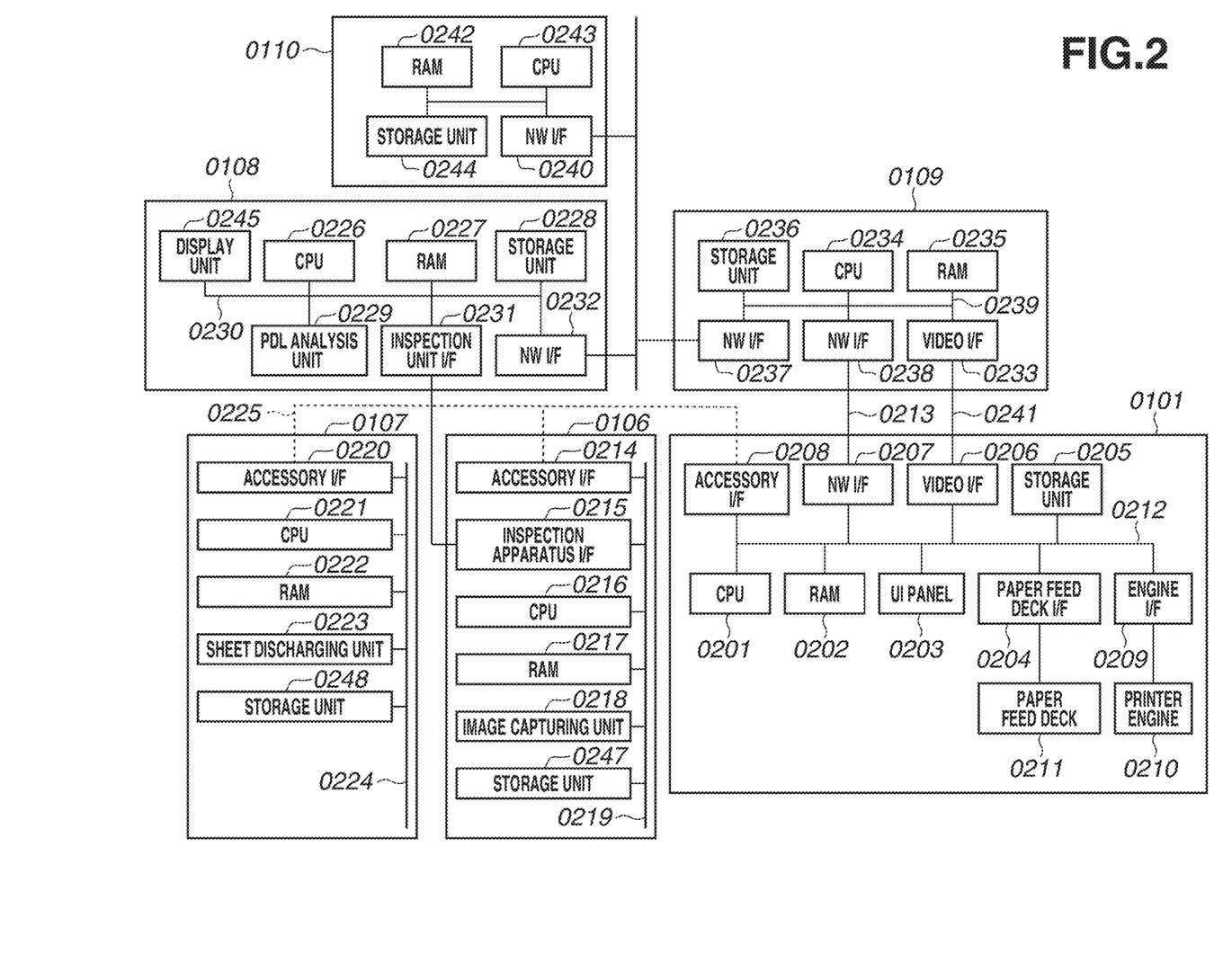
FIG. 2 is a block diagram illustrating a configuration of the information processing apparatus, the inspection apparatus, and the image forming apparatus.

FIG. 2 is a block diagram illustrating a configuration for controlling the image forming apparatus 0101, the inspection apparatus 0108, the large capacity stacker 0107, the information processing apparatus 0109, and the client computer 0110 according to the present exemplary embodiment.

A central processing unit (CPU) 0201 performs control and calculation for each component of the image forming apparatus 0101 via a system bus 0212. The CPU 0201 functions as a processor that executes each step of processing to be described below, by executing a program stored in a storage unit 0205 that is a computer readable storage unit and loaded into a random access memory (RAM) 0202. The RAM 0202 is one type of general volatile storage that can be directly accessed from the CPU 0201, and used as a work area of the CPU 0201 or other temporary data storage area. The storage unit 0205 functions as a temporary storage area and a work memory when the image forming apparatus 0101 operates. An engine interface (I/F) 0209 communicates with a printer engine 0210. A paper feed deck I/F 0204 communicates with a paper feed deck 0211. The paper feed deck 0211 is a hardware configuration representing the paper feed deck 0103, the paper feed deck 0104, and the optional deck 0105. A UI panel 0203 is a hardware configuration of the UI panel 0102, and is a user interface for operating the image forming apparatus 0101. In the present exemplary embodiment, the UI panel 0203 includes a capacitance-type touch panel.

A network interface (NW I/F) 0207 is connected to a NW I/F 0238 of the information processing apparatus 0109 via a communication cable 0213, and used in communication between the information processing apparatus 0109 and the image forming apparatus 0101. In this example, the NW I/F 0207 connected to the system bus 0212 and the NW I/F 0238 connected to a system bus 0239 are directly connected to each other, but the connection is not limited to this example. For example, the information processing apparatus 0109 and the image forming apparatus 0101 may be connected via a network such as a local area network (LAN), i.e., the connection form thereof is not limited. A video I/F 0206 is connected to a video I/F 0233 via a video cable 0241, and used in image data communication between the information processing apparatus 0109 and the image forming apparatus 0101. The connection interface with the image forming apparatus 0101 in the information processing apparatus 0109 may take a form in which the function of the NW I/F 0238 and the function of the video I/F 0233 are combined. The connection interface with the information processing apparatus 0109 in the image forming apparatus 0101 may take a form in which the function of the NW I/F 0207 and the function of the video I/F 0206 are combined.

An accessory I/F 0208 is connected to an accessory I/F 0214 and an accessory I/F 0220 via a communication cable 0225. In other words, the image forming apparatus 0101 can communicate with the inspection unit 0106 and the large capacity stacker 0107 via the accessory I/Fs 0208, 0214, and 0220.

A CPU 0216 performs control and calculation for each component of the inspection unit 0106 via a system bus 0219. The CPU 0216 functions as a processor that executes each step of processing to be described below, by executing a program stored in a storage unit 0247 that is a computer readable storage unit and loaded into a RAM 0217. The RAM 0217 is one type of general volatile storage that can be directly accessed from the CPU 0216, and used as a work area of the CPU 0216 or other temporary data storage area. The storage unit 0247 functions as a temporary storage area and a work memory when the inspection unit 0106 operates. An inspection apparatus I/F 0215 connects to an inspection unit I/F 0231 via a communication cable. In other words, the inspection unit 0106 is used in communication with the inspection apparatus 0108 via the inspection apparatus I/F 0215 and the inspection unit I/F 0231. An image capturing unit 0218 has, for example, an image capturing function (a scan function) using a contact image sensor (CIS), and transmits an image generated by capturing an image (performing reading scan) of a sheet passing through the inspection unit 0106 to the inspection apparatus 0108 via the inspection apparatus I/F 0215. The CIS of the image capturing unit 0218 is an example of a sensor, and other type of sensor such as a charge coupled device (CCD) image sensor may be used. The image capturing method (scan method) of the image capturing unit 0218 is not limited.

A CPU 0221 performs control and calculation for each component of the large capacity stacker 0107 via a system bus 0224. The CPU 0221 functions as a processor that executes each step of processing to be described below, by executing a program stored in a storage unit 0248 that is a computer readable storage unit and loaded into a RAM 0222. The RAM 0222 is one type of general volatile storage that can be directly accessed from the CPU 0221, and used as a work area of the CPU 0221 or other temporary data storage area. A sheet discharging unit 0223 performs operations for discharging sheets to the main tray and the top tray, and also controls and monitors the sheet stacking state of each of the main tray and the top tray.

A CPU 0226 of the inspection apparatus 0108 performs control and calculation for each component of the inspection apparatus 0108 via a system bus 0230. The CPU 0226 functions as a processor that executes each step of processing to be described below, by executing a program stored in a storage unit 0228 that is a computer readable storage unit and loaded into a RAM 0227. The RAM 0227 is one type of general volatile storage that can be directly accessed from the CPU 0226, and used as a work area of the CPU 0226 or other temporary data storage area. The storage unit 0228 functions as a temporary storage area and a work memory when the inspection apparatus 0108 operates. A page description language (PDL) analysis unit 0229 reads PDL data in a format such as Portable Document Format (PDF), PostScript, or Printer Command Language (PCL) received from the client computer 0110 or the information processing apparatus 0109, and executes interpretation processing. A display unit 0245 is, for example, a liquid crystal display connected to the inspection apparatus 0108. The display unit 0245 accepts user inputs to the inspection apparatus 0108, and displays the state of the inspection apparatus 0108.

A CPU 0234 of the information processing apparatus 0109 performs control and calculation for each component of the information processing apparatus 0109 via the system bus 0239. The CPU 0234 functions as a processor that executes each step of processing to be described below, by executing a program stored in a storage unit 0236 that is a computer readable storage unit and loaded into a RAM 0235. The RAM 0235 is one type of general volatile storage that can be directly accessed from the CPU 0234, and used as a work area of the CPU 0234 or other temporary data storage area. The storage unit 0236 functions as a temporary storage area and a work memory when the information processing apparatus 0109 operates. A network interface 0237 is connected to a NW I/F 0232 and a NW I/F 0240 via a network. The information processing apparatus 0109 communicates with the inspection apparatus 0108 via the NW I/F 0237 and the NW I/F 0232. The information processing apparatus 0109 communicates with the client computer 0110 via the NW I/F 0237 and the NW I/F 0240.

A CPU 0243 of the client computer 0110 performs control and calculation for each component of the client computer 0110 via a system bus 0246. The CPU 0243 functions as a processor that executes each step of processing to be described below, by executing a program stored in a storage unit 0244 that is a computer readable storage unit and loaded into a RAM 0242. The RAM 0242 is one type of general volatile storage that can be directly accessed from the CPU 0243, and used as a work area of the CPU 0243 or other temporary data storage area.

The storage unit 0244 functions as a temporary storage area and a work memory when the client computer 0110 operates.

Figure 3:
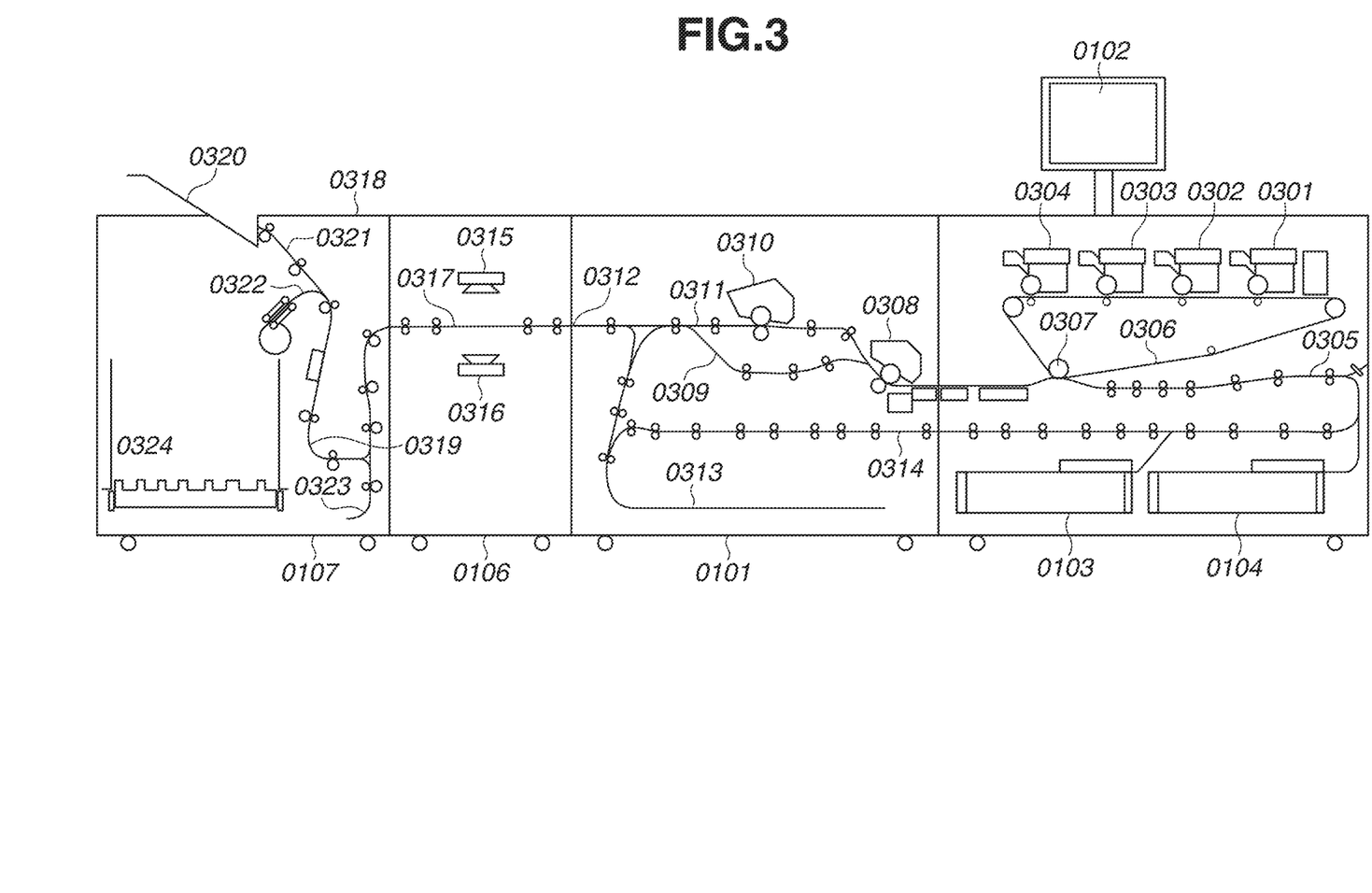
FIG. 3 is a diagram illustrating an internal arrangement of the information processing apparatus, an inspection unit, the image forming apparatus, and a large capacity stacker.

FIG. 3 is a diagram illustrating an internal arrangement of the image forming apparatus 0101, the inspection unit 0106, and the large capacity stacker 0107. The image forming apparatus 0101 accepts user inputs via the UI panel 0102, and displays the status of printing or the apparatus. Various types of sheets can be stored in the paper feed decks 0103 and 0104. In each of the paper feed decks 0103 and 0104, only the uppermost sheet of the stored sheets can be separated and conveyed to a sheet conveyance path 0305. Toner images are formed at development stations 0301, 0302, 0303, and 0304, with color toners of Y, M, C, and K, respectively, to form a color image. The toner images formed at the development stations are primarily transferred to an intermediate transfer belt 0306. The intermediate transfer belt 0306 turns clockwise in FIG. 3, and the toner images are transferred to a sheet conveyed from the sheet conveyance path 0305 at a secondary transfer position 0307. A fixing unit 0308 includes a pressing roller and a heat roller, and fixes the toner images to the sheet when the sheet is passing between these rollers, and the toner is melted and pressed. The sheet that has left the fixing unit 0308 is conveyed to a sheet conveyance path 0312 via a sheet conveyance path 0309. In a case where it is desirable to additionally melt and press the toner for fixing the toner images depending on the type of sheet, the sheet that has passed through the fixing unit 0308 is conveyed to a second fixing unit 0310 using an upper sheet conveyance path, the toner is additionally melted and pressed on the sheet, and then the sheet is conveyed to the sheet conveyance path 0312 via a sheet conveyance path 0311. In a case where an image forming mode is a two-sided mode, the sheet is conveyed to a sheet reversing path 0313, and the sheet reversed in the sheet reversing path 0313 is conveyed to a two-sided conveyance path 0314, and an image is transferred onto the second side at the secondary transfer position 0307.

A CIS 0315 and a CIS 0316 are disposed to face each other in the inspection unit 0106. The CIS 0315 is a sensor for reading the upper side of a sheet and the CIS 0316 is a sensor for reading the lower side of the sheet. At the timing when the sheet conveyed to a sheet conveyance path 0317 arrives at a predetermined position, the inspection unit 0106 scans the sheet using the CIS 0315 and the CIS 0316. An image generated by the scan is transmitted to the inspection apparatus 0108 via the inspection apparatus I/F 0215 and the inspection unit I/F 0231. The CPU 0226 of the inspection apparatus 0108 determines whether the received image has a defect, and notifies the inspection unit 0106 of the determination result via the inspection unit I/F 0231 and the inspection apparatus I/F 0215. The CPU 0216 of the inspection unit 0106 notifies the large capacity stacker 0107 of the received determination result via the accessory I/F 0214 and the accessory I/F 0220.

A large number of sheets can be stacked in the large capacity stacker 0107. The large capacity stacker 0107 has a main tray 0324 as a tray for stacking the sheets. The sheet that has passed through the inspection unit 0106 enters the large capacity stacker 0107 via a sheet conveyance path 0319. In a case where the inspection apparatus 0108 determines that the sheets are correctly printed, the sheets are conveyed from the sheet conveyance path 0319 and stacked on the main tray 0324 via a sheet conveyance path 0322. The large capacity stacker 0107 has a top tray 0320 as a sheet discharging tray. The CPU 0221 performs control to discharge a sheet having a defect detected by the inspection apparatus 0108 to the top tray 0320. In a case where the sheet is output to the top tray 0320, the sheet is conveyed from the sheet conveyance path 0319 to the top tray 0320 via a sheet conveyance path 0321. A reversing portion 0323 reverses the sheet. The reversing portion 0323 is used in a case where the sheets are stacked on the main tray 0324. In a case where the sheets are stacked on the main tray 0324 so that the direction of the incoming sheet and the directions of the stacked sheets are the same, the sheets are each reversed once by the reversing portion 0323. In a case where the sheet is conveyed to the top tray 0320, the sheet is directly discharged without being flipped, and thus the reversing portion 0323 does not perform reversing operation.

Processing according to the present disclosure will be described with reference to a flowchart and an example of a screen.

A program of the image forming apparatus 0101 according to the flowchart is stored in the storage unit 0205 of the image forming apparatus 0101, and the program is read out into the RAM 0202 and executed by the CPU 0201. A program of the inspection apparatus 0108 according to the flowchart is stored in the storage unit 0228 of the inspection apparatus 0108, and the program is read out into the RAM 0227 and executed by the CPU 0226.

A program of the information processing apparatus 0109 according to the flowchart is stored in the storage unit 0236 of the information processing apparatus 0109, and the program is read out into the RAM 0235 and executed by the CPU 0234. A program of the client computer 0110 according to the flowchart is stored in the storage unit 0244 of the client computer 0110, and the program is read out into the RAM 0242 and executed by the CPU 0243.

Figure 4:
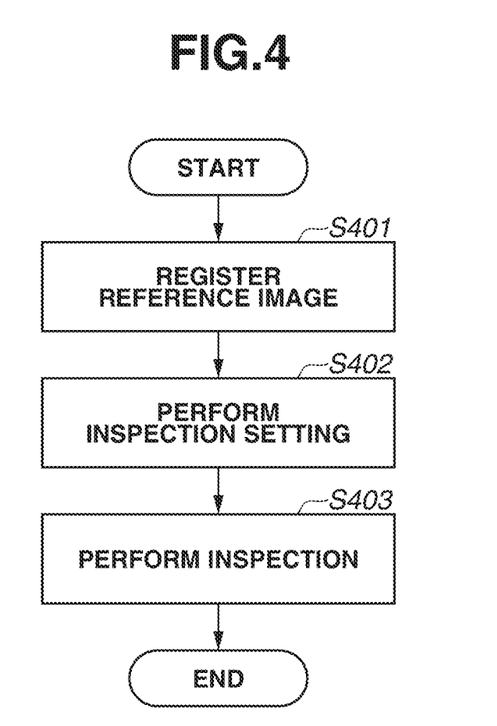
FIG. 4 is a flowchart illustrating overall inspection processing.

An overall process from reference registration work before start of inspection to inspection execution will be described with reference to a flowchart in FIG. 4.

In step S401, a user performs work for registering a reference image to be the reference of inspection. The user executes a print job for reference image registration at the client computer 0110, so that a reference image is generated. The inspection apparatus 0108 reads and registers the generated reference image.

In step S402, the user performs inspection setting to set various inspection parameters, an inspection area, and an inspection level. The details will be described below.

In step S403, the inspection apparatus 0108 inspects a printed material that is printed in the image forming apparatus 0101. In other words, the client computer 0110 generates a print job for producing a printed material to be inspected, and the generated print job is transmitted to the information processing apparatus 0109 and managed in the information processing apparatus 0109. When the image forming apparatus 0101 executes the print job and outputs a printed sheet, the inspection unit 0106 detects conveyance of the printed sheet, scans the printed sheet using the CIS 0315 and the CIS 0316, and stores the scanned image into the RAM 0227 of the inspection apparatus 0108. The inspection apparatus 0108 inspects the sheet to determine whether the sheet is correctly printed, by comparing the stored scanned image with the reference image, and outputs an inspection result. The inspection is executed based on setting values designated by the user in the inspection setting. The large capacity stacker 0107 can discharge a printed sheet in a case where it is determined that the printed sheet has a defect based on the inspection result.

The details of the inspection setting in step S402 will be described with reference to FIG. 5. The inspection setting is started when the reference image registered in the reference registration is selected.

The reference image is displayed in a preview display area 0501 as a preview. In a case where the reference image is generated based on a print job of a plurality of pages, the reference images of the respective pages can be sequentially displayed, in response to an operation for switching the reference images each displayed as a preview.

A frame 0502 indicates an inspection area on the preview. The inspection area is placed using an inspection area placement button 0503. For example, after pressing the inspection area placement button 0503, the user selects a type of inspection area from a displayed pull-down menu, and then selects an area that the user wants to designate as the inspection area in the preview display area 0501 by dragging a mouse, so that an operation of placing the inspection area is accepted. An operation of selecting the inspection area can be accepted by a user's operation of clicking the mouse, and the size and the position can be changed by the user's operation of dragging the mouse. The frame 0502 indicates an example in which an inspection area for inspecting a QR Code (registered trademark) is placed.

A setting item 0504 is provided to select data for collation inspection by a file selection method.

The data for collation inspection is a reference CSV file in which correct data to be used in data collation inspection is stored. The reference CSV file is a file to be prepared beforehand by the user, in a case where the collation inspection is to be performed. The reference CSV file is a file in which a correct character string for character string inspection and a correct character string in decoding for two-dimensional code (or barcode) inspection are listed. When data inspection is executed, an OCR result of a character string image and a decoding result of a code image (a two-dimensional code or barcode) are collated with the correct character strings listed in the reference CSV file.

A setting item 0505 is an item for the selected area, and individual setting values for the inspection area selected in the preview display area 0501 by clicking the mouse are displayed.

A setting item 0506 is an item for a page range. When the user selects each button, an operation of designating a page range for which inspection is to be executed based on the selected inspection area is accepted. In a case where nothing is selected in the item, the selected inspection area is placed only in a page currently displayed in the preview display area 0501. In a case where "same side as current page" is selected, the selected inspection area is placed also in other page on the same side (front side or back side), depending on which one of the front side and the back side of the sheet is the side where the selected inspection area is placed. In a case where "all pages" is selected, the selected inspection area is placed in each of all pages, regardless of the front side or the back side.

Figure 5:
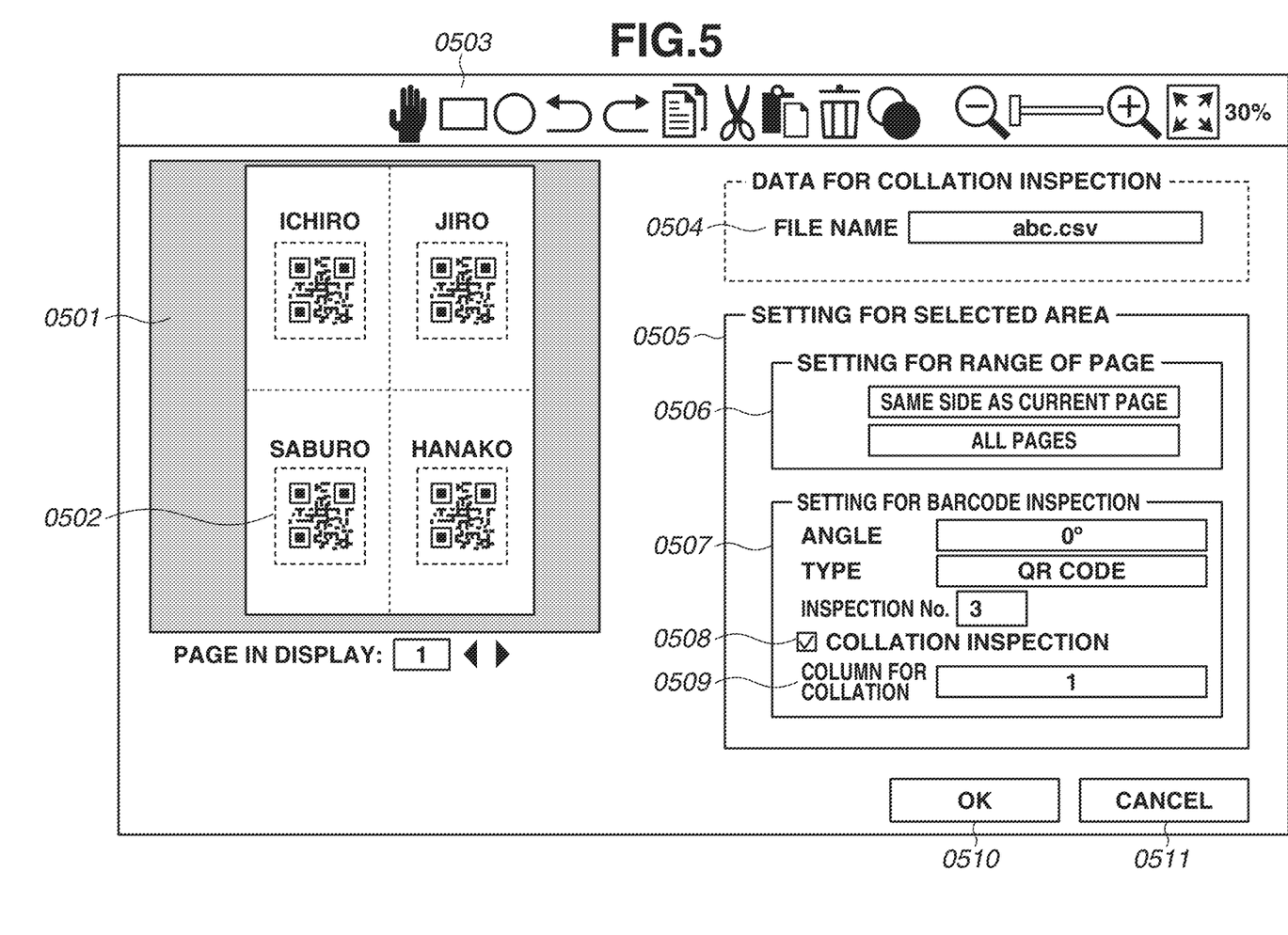
FIG. 5 is a diagram illustrating an inspection setting screen.

A setting item 0507 is an item for barcode inspection and is displayed when the inspection area in the frame 0502 is selected in FIG. 5. For each inspection area, an angle of the inspection area, a type of code image (two-dimensional code or barcode), and an inspection number are set. The angle of the inspection area can be set in 90-degree increments. The inspection number is a serial number for uniquely identifying the inspection area, and automatically assigned not to overlap with those of other inspection areas when the inspection area is generated using the inspection area placement button 0503.

A setting item 0508 is provided to determine whether to perform the collation inspection. The collation inspection can be set by checking a check box, and the decoding result or character recognition result of the inspection area is collated with the data stored in the reference CSV. In a case where the check box is not checked, the reading inspection is automatically set. An item 0509 is provided to set which column of the reference CSV is to be used for collation in the collation inspection. The item is enabled only in a case where the check box of the collation inspection is checked in the item 0508, and is used to identify the correct data for the inspection area when the inspection area is to be inspected.

For example, in a case where "1" is input, the correct data for the inspection area selected in the frame 0502 is described in the first column of the reference CSV file.

An OK button 0510 is a button for completing the inspection setting. When the OK button 0510 is pressed by the user, the inspection setting is completed and stored into the storage unit 0228, and the inspection setting processing ends. In a case where the reading inspection is to be performed, the inspection setting is stored into the RAM 0217 by pressing the OK button 0510 after the inspection area in the frame 0502, the setting item 0505 for the area, and the setting item 0506 for the page range are set.

In a case where the collation inspection is to be performed, the inspection setting is stored into the RAM 0217 by pressing the OK button 0510 in a state where, in addition to the inspection area in the frame 0502, the setting item 0505 for the area, and the setting item 0506 for the page range, the reference CSV file in the setting item 0504, the check box in the item 0508, and the collation column in the item 0509 are input. The OK button 0510 for completing the inspection setting may be disabled so that the OK button 0510 is not pressed, in a case where the inspection setting has inconsistency. Examples of the inconsistency of the inspection setting include a state where the inspection area for executing the collation inspection is present but the setting item 0504 for the data for collation inspection is not set. A cancel button 0511 is provided to cancel the inspection setting. When the user presses the cancel button 0511, the inspection setting is canceled and the inspection setting processing ends.

The details of inspection processing will be described with reference to FIG. 6 and a flowchart in FIG. 7. The inspection processing is started when the inspection setting stored in the RAM 0217 is selected and the inspection apparatus 0108 is turned into an inspection standby state.

Figure 6:
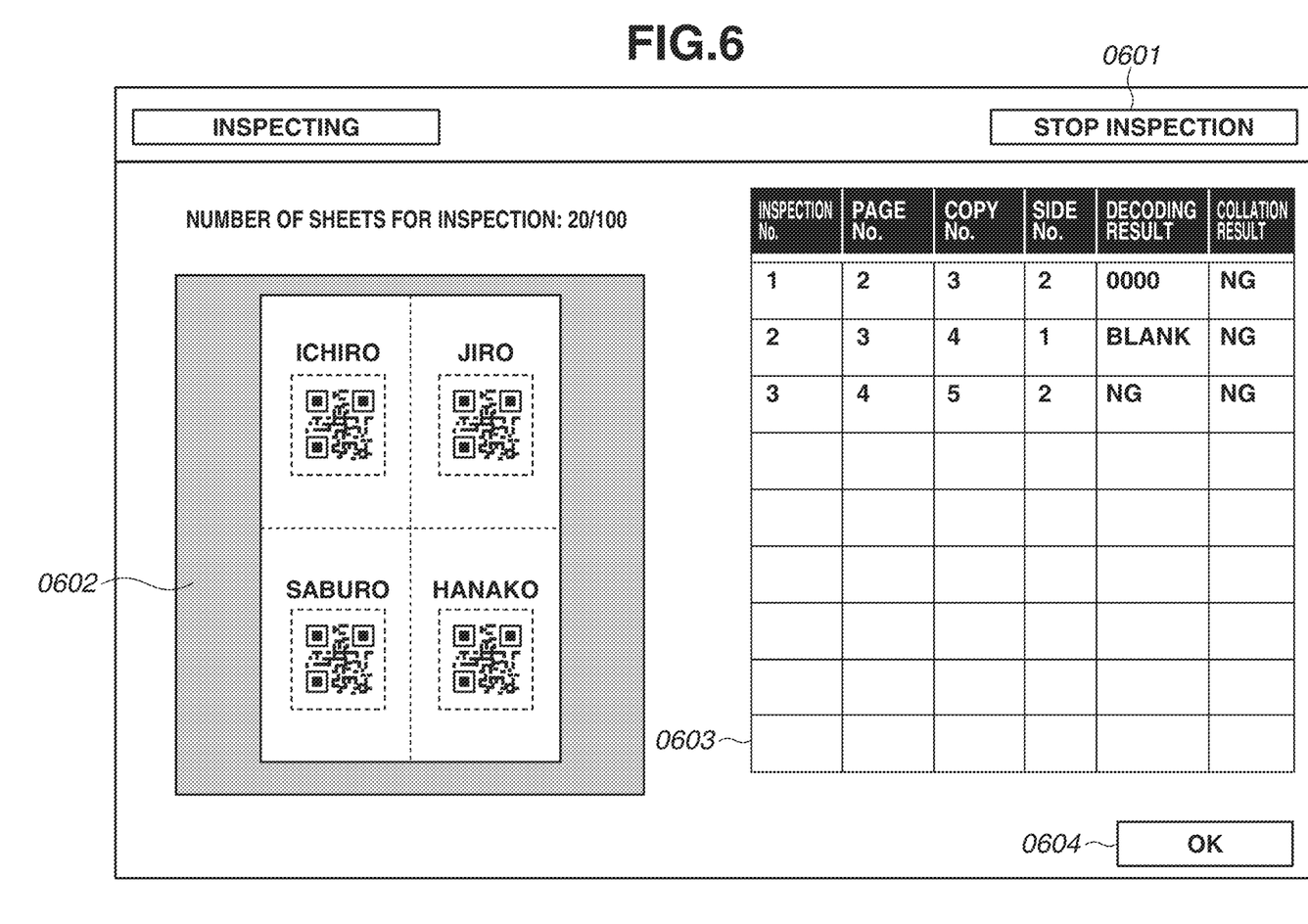
FIG. 6 is a diagram illustrating an inspection screen.

An inspection start/stop button 0601 is provided to change the state of the CPU 0226 in FIG. 6.

When the state of the CPU 0226 is a non-inspection state, the user presses the inspection start/stop button 0601 so that the state of the CPU 0226 is changed to the inspection standby state, and the inspection is started. When the state of the CPU 0226 is the inspection standby state, the user presses the inspection start/stop button 0601 so that the state of the CPU 0226 is changed to the non-inspection state, and the inspection stops.

An inspection area display portion 0602 is a portion in which the inspection area based on the currently selected inspection setting can be previewed.

Inspection results are displayed in an inspection result table 0603. An area where a failure has occurred in the inspection can be identified in the inspection result table 0603. In the inspection result table 0603, "inspection No." indicating the inspection area in a page, "page No." indicating the page, "copy No." indicating a copy including the page, and "side No." indicating the back side or the front side are displayed. A decoding result (recognition result) and a collation result indicating whether collation is successfully performed are also displayed in the inspection area where the failure has occurred. In the reading inspection, no result is displayed in the field of the collation result.

An OK button 0604 is a button for completing the inspection processing. In a case where the user presses the OK button 0604 for completing the inspection processing, the inspection processing is completed, and the inspection result is stored into the storage unit 0228, so that the inspection processing ends. The OK button 0604 for completing the inspection processing may be disabled so that the OK button 0604 is not pressed in a case where the CPU 0226 is in the middle of the inspection.

Figure 7:
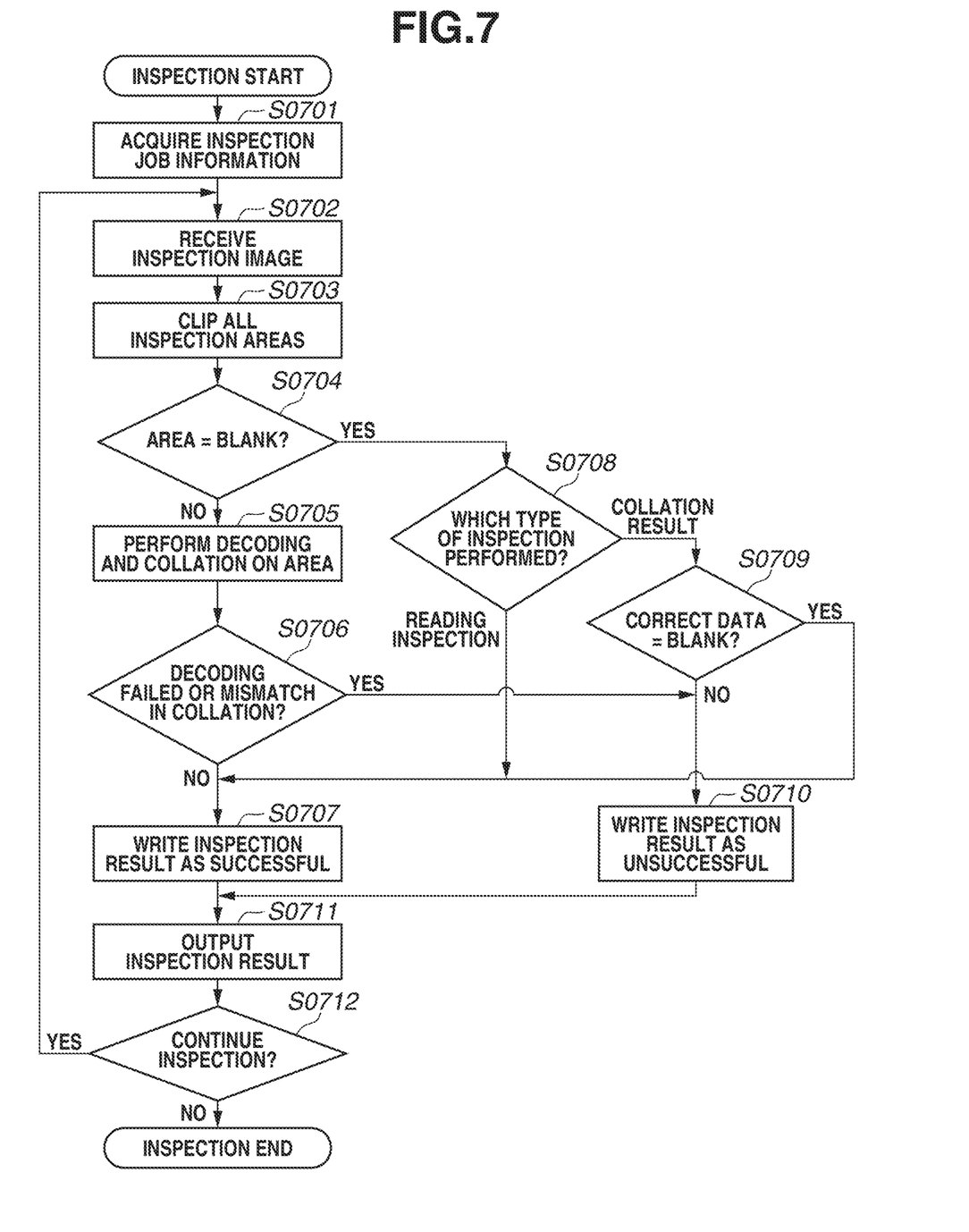
FIG. 7 is a flowchart illustrating inspection processing.

FIG. 7 is a flowchart illustrating processing in the inspection apparatus 0108 to be performed when the inspection processing is started for the inspection apparatus 0108. In response to an operation of pressing the inspection start/stop button 0601 in an inspection screen displayed on the UI panel 0203, the CPU 0226 is turned into the inspection standby state and executes various types of processing.

In step S0701, the CPU 0226 acquires inspection job information from the RAM 0227, and loads the acquired inspection job information into the storage unit 0228. The inspection job information indicates a data set including the inspection setting, the reference image, and the reference CSV file described above.

In step S0702, the CPU 0226 receives an inspection image from the inspection unit 0106 via the inspection unit I/F 0231.

In step S0703, the CPU 0226 clips all inspection areas based on the inspection setting read out in step S0701 from the inspection image received in step S0702, and writes images of the clipped inspection areas into the storage unit 0228.

In step S0704, the CPU 0226 performs blank determination as to whether the clipped inspection area is a blank. The CPU 0226 divides the inspection area into a plurality of blocks, and calculates a histogram of pixel values for each block. In a case where there is a block for which the histogram of pixel values stands out, the CPU 0226 determines that an object is present. In a case where there is no such a block, the CPU 0226 determines that the inspection area is a blank. This method of determining a blank is an example, and there are various methods other than the example described in the present exemplary embodiment. In a case where the inspection area is a blank (YES in step S0704), the processing proceeds to step S0708. In a case where the inspection area is not a blank (NO in step S0704), the processing proceeds to step S0705.

In step S0705, the CPU 0226 decodes (recognizes) an object printed in the inspection area, and writes the result of decoding into the storage unit 0228. In a case where the inspection setting indicates the collation inspection, the reference CSV file (correct data) and the decoding result are collated with each other.

In step S0706, the CPU 0226 divaricates the processing based on the decoding result and the collation result obtained in step S0705. In a case where the decoding result and the correct data match each other as the result of the collation (NO in step S0706), the processing proceeds to step S0707. On the other hand, in a case where there is a mismatch as the result of the collation or in a case where the decoding itself fails (YES in step S0706), the processing proceeds to step S0710.

In step S0707, the CPU 0226 writes the decoding result and the collation result, as well as the inspection No., the page No., the copy No., and the side No. into the RAM 0227, as an inspection success.

In step S0708, the CPU 0226 determines whether the inspection area is a target of the collation inspection or a target of the reading inspection, based on the inspection job information acquired in step S0701. In a case where the inspection area is a target of the reading inspection, the result of reading is a blank, and thus the processing proceeds to step S0707. In a case where the inspection area is a target of the collation inspection, the processing proceeds to step S0709.

In step S0709, the CPU 0226 reads out the correct data for the inspection area from the inspection job information acquired in step S0701. In a case where nothing is in the applicable portion of the read-out correct data, the correct data is a blank (YES in step S0709), which matches with "blank" determined in step S0704, and thus the processing proceeds to step S0707. On the other hand, in a case where there is data in the applicable portion of the read-out correct data, the correct data is not a blank (NO in step S0709), which does not match with "blank" determined in step S0704, and thus the processing proceeds to step S0710.

In step S0710, the CPU 0226 writes the inspection No., page No., copy No., and side No. of the inspection area into the RAM 0227 as an inspection failure, in a case where the decoding result or the collation result is a failure. The CPU 0226 displays the inspection No., page No., copy No., side No., decoding result, and collation inspection result of the area where the inspection failure has occurred, in the inspection result table 0603.

In step S0711, the CPU 0226 notifies the inspection unit 0106 whether the inspection result is a success as written in step S0707 or a failure as written in step S0710, via the inspection unit I/F 0231.

In step S0712, the CPU 0226 determines whether the inspection processing is to be continued. In a case where the OK button 0604 for completing the inspection processing is pressed to complete the inspection processing (NO in step S0712), the inspection ends. In a case where the OK button 0604 for completing the inspection processing is not pressed (YES in step S0712), the processing returns to step S0702 to repeat the inspection. The determination as to whether to continue the inspection is not limited to the press of the OK button 0604 for completing the inspection processing, and may be performed by setting the number of sheets for inspection beforehand and determining whether the number of inspected sheets reaches the set number of sheets.

In this way, it is possible to regard the inspection result as a success, in a case where it is possible to determine that a blank is correct by referring to the correct data, instead of always determining the inspection result as a failure in a case where the inspection area is a blank, in the inspection area of the code image (barcode and two-dimensional code).

A second exemplary embodiment will be described with reference to FIG. 8 and a flowchart in FIG. 9. In the second exemplary embodiment, a user can select whether an inspection result is to be handled as a success or a failure when a blank is read at the time of the reading inspection, when inspection setting is performed. Description of operations common to the first exemplary embodiment will be omitted.

Figure 8:
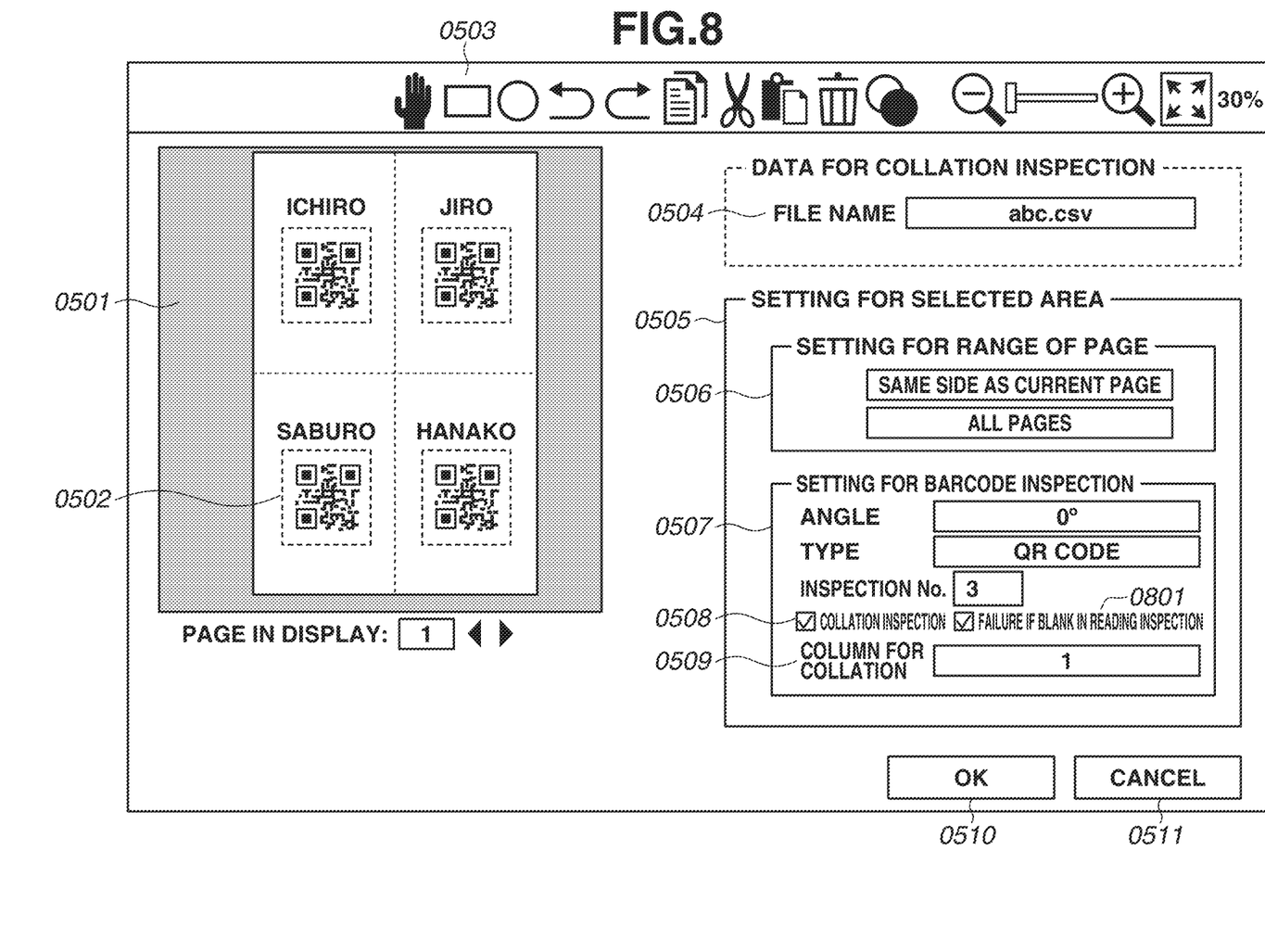
FIG. 8 is a diagram illustrating an inspection setting screen according to a second exemplary embodiment.

FIG. 8 is a diagram illustrating a screen in the display unit 0245 when the inspection setting is performed for the inspection apparatus 0108, according to the second exemplary embodiment.

In a case where a check box 0801 is checked, "a flag for handling an inspection always as a failure when an inspection area of a code image is a blank in reading inspection" is turned on, and this result is added to the inspection setting and the inspection setting is stored into the RAM 0227.

Figure 9:
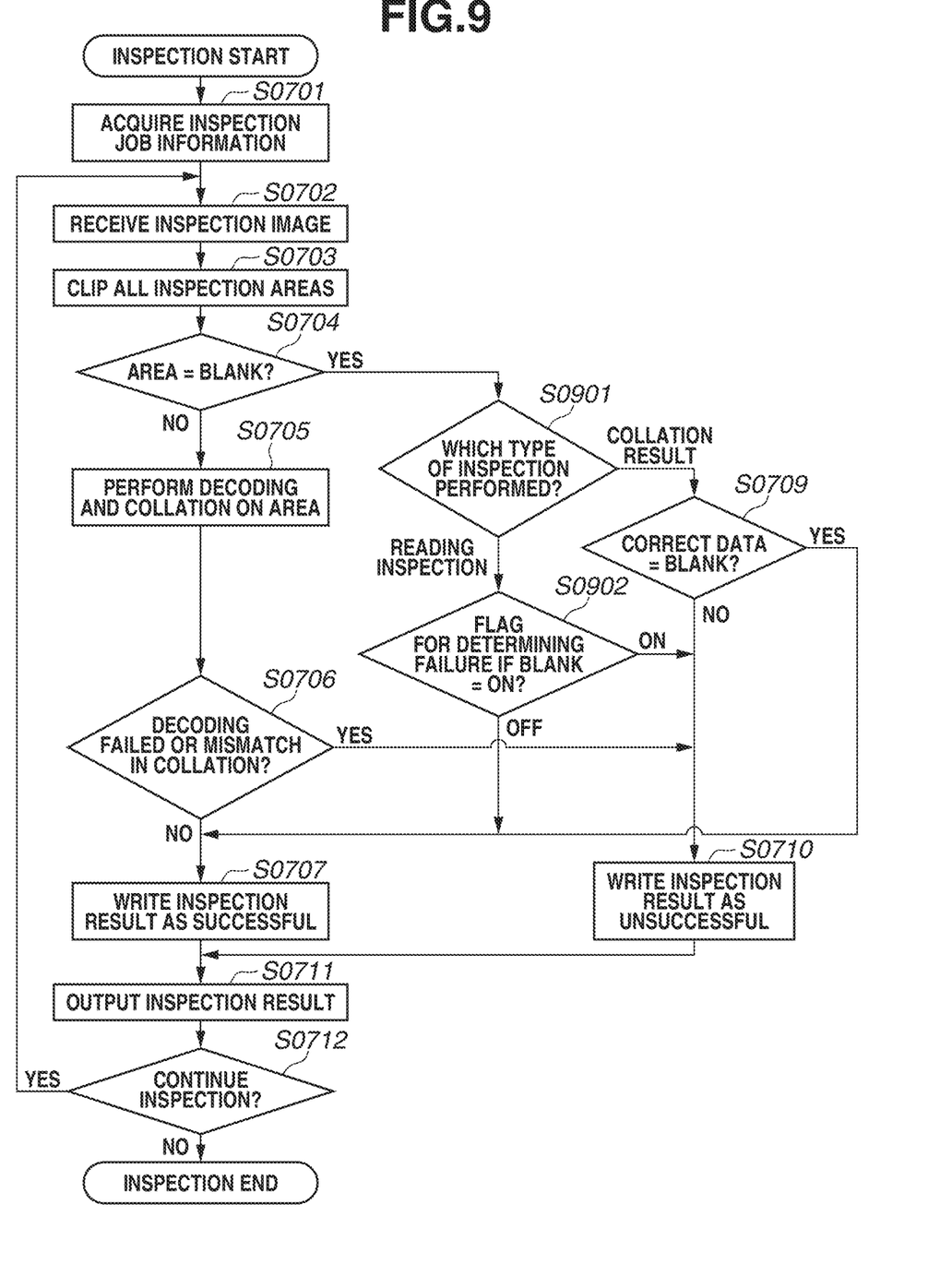
FIG. 9 is a flowchart illustrating inspection processing according to the second exemplary embodiment.

FIG. 9 is a flowchart illustrating processing in the inspection apparatus 0108 to be performed when the inspection processing is started for the inspection apparatus 0108, according to the second exemplary embodiment.

In step S0901, the CPU 0226 determines whether the inspection area is a target of the collation inspection or a target of the reading inspection, based on the inspection job information acquired in step S0701. In a case where the inspection area is a target of the reading inspection, the processing proceeds to step S0902. In a case where the inspection area is a target of the collation inspection, the processing proceeds to step S0709.

In step S0902, the CPU 0226 determines whether the above-described flag is ON, in the inspection setting acquired in step S0701. In a case where the flag is OFF (NO in step S0902), the processing proceeds to step S0707. In a case where the flag is ON (YES in step S0902), the processing proceeds to step S0710.

According to the second exemplary embodiment, the user can set beforehand whether the inspection result is handled as a success or a failure in a case where the inspection area is a target of the reading inspection and also a blank, in the inspection area of the code image (barcode and two-dimensional code).

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-140733, filed Aug. 31, 2021, which is hereby incorporated by reference herein in its entirety.

What is claimed is:

1. An inspection apparatus comprising:
at least one memory that stores instructions; and
at least one processor that executes the instructions to perform:
outputting, in a case where an image of an inspection area to be subjected to collation inspection for collating a result of decoding the image of the inspection area with correct data is not a blank and where the result of decoding the image of the inspection area matches with the correct data, an inspection result for the inspection area as a success;
outputting, in a case where the image of the inspection area is not a blank and where the result of decoding the image of the inspection area does not match with the correct data, an inspection result for the inspection area as a failure;
outputting, in a case where the image of the inspection area is a blank and where the correct data is a blank, an inspection result for the inspection area as a success; and
outputting, in a case where the image of the inspection area is a blank and where the correct data is not a blank, an inspection result for the inspection area as a failure.

2. The inspection apparatus according to claim 1, wherein the at least one processor executes the instructions to further perform outputting, in a case where an image of a second inspection area to be subjected to reading inspection for determining whether the image of the second inspection area is readable is a blank, an inspection result for the second inspection area as a success.

3. The inspection apparatus according to claim 1, wherein the at least one processor executes the instructions to further perform:
setting whether to output an inspection result in a case where an image of a second inspection area to be subjected to reading inspection for determining whether the image of the second inspection area is readable is a blank, as a failure or a success;

outputting an inspection result for the second inspection area as a failure, in a case where the image of the second inspection area to be subjected to the reading inspection is a blank and where a setting for outputting the inspection result for the second inspection area as a failure is set in the setting; and outputting an inspection result for the second inspection area as a success, in a case where the image of the second inspection area to be subjected to the reading inspection is a blank and where a setting for outputting the inspection result for the second inspection area as a success is set in the setting.

4. The inspection apparatus according to claim 1, wherein the inspection area is an area in a scanned image obtained by reading a printed material.

5. A method to be executed by an inspection apparatus, the method comprising:

outputting, in a case where an image of an inspection area to be subjected to collation inspection for collating a result of decoding the image of the inspection area with correct data is not a blank and where the result of decoding the image of the inspection area matches with the correct data, an inspection result for the inspection area as a success;

outputting, in a case where the image of the inspection area is not a blank and where the result of decoding the image of the inspection area does not match with the correct data, an inspection result for the inspection area as a failure;

outputting, in a case where the image of the inspection area is a blank and where the correct data is a blank, an inspection result for the inspection area as a success; and outputting, in a case where the image of the inspection area is a blank and where the correct data is not a blank, an inspection result for the inspection area as a failure.

6. The method according to claim 5, further comprising outputting, in a case where an image of a second inspection area to be subjected to reading inspection for determining whether the image of the second inspection area is readable is a blank, an inspection result for the second inspection area as a success.

7. The method according to claim 5, further comprising:

setting whether to output an inspection result in a case where an image of a second inspection area to be subjected to reading inspection for determining whether the image of the second inspection area is readable is a blank, as a failure or a success;

outputting an inspection result for the second inspection area as a failure, in a case where the image of the second inspection area to be subjected to the reading inspection is a blank and where a setting for outputting the inspection result for the second inspection area as a failure is set in the setting; and outputting an inspection result for the second inspection area as a success, in a case where the image of the second inspection area to be subjected to the reading inspection is a blank and where a setting for outputting the inspection result for the second inspection area as a success is set in the setting.

8. The method according to claim 5, wherein the inspection area is an area in a scanned image obtained by reading a printed material.

9. A non-transitory computer readable storage medium that stores a program including instructions, which when executed by one or more processors, cause the one or more processors to perform:

outputting, in a case where an image of an inspection area to be subjected to collation inspection for collating a result of decoding the image of the inspection area with correct data is not a blank and where the result of decoding the image of the inspection area matches with the correct data, an inspection result for the inspection area as a success;

outputting, in a case where the image of the inspection area is not a blank and where the result of decoding the image of the inspection area does not match with the correct data, an inspection result for the inspection area as a failure;

outputting, in a case where the image of the inspection area is a blank and where the correct data is a blank, an inspection result for the inspection area as a success; and outputting, in a case where the image of the inspection area is a blank and where the correct data is not a blank, an inspection result for the inspection area as a failure.

10. The non-transitory computer readable storage medium according to claim 9, wherein the instructions, when executed by one or more processors, further cause the one or more processors to perform outputting, in a case where an image of a second inspection area to be subjected to reading inspection for determining whether the image of the second inspection area is readable is a blank, an inspection result for the second inspection area as a success.

11. The non-transitory computer readable storage medium according to claim 9, wherein the instructions, when executed by the one or more processors, further cause the one or more processors to perform:

setting whether to output an inspection result in a case where an image of a second inspection area to be subjected to reading inspection for determining whether the image of the second inspection area is readable is a blank, as a failure or a success;

outputting an inspection result for the second inspection area as a failure, in a case where the image of the second inspection area to be subjected to the reading inspection is a blank and where a setting for outputting the inspection result for the second inspection area as a failure is set in the setting; and outputting an inspection result for the second inspection area as a success, in a case where the image of the second inspection area to be subjected to the reading inspection is a blank and where a setting for outputting the inspection result for the second inspection area as a success is set in the setting.

12. The non-transitory computer readable storage medium according to claim 9, wherein the inspection area is an area in a scanned image obtained by reading a printed material.

* * * * *